(12) United States Patent
Watkins et al.

(10) Patent No.: US 10,467,165 B2
(45) Date of Patent: Nov. 5, 2019

(54) USB-C PORT CONNECTIONS BASED ON MULTI-LEVEL STRAPS

(71) Applicant: HEWLETT-PACKARD DEVELOPMENT COMPANY, L.P., Houston, TX (US)

(72) Inventors: Connor Jam Watkins, Ft. Collins, CO (US); Christopher Ritchie Tabarez, Ft. Collins, CO (US); Amol Subhash Pandit, Ft. Collins, CO (US); Peter Andrew Seiler, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 19 days.

(21) Appl. No.: 15/748,507

(22) PCT Filed: Jan. 11, 2016

(86) PCT No.: PCT/US2016/012837
§ 371 (c)(1),
(2) Date: Jan. 29, 2018

(87) PCT Pub. No.: WO2017/123193
PCT Pub. Date: Jul. 20, 2017

(65) Prior Publication Data
US 2018/0217956 A1    Aug. 2, 2018

(51) Int. Cl.
*G06F 13/20*     (2006.01)
*G06F 13/38*     (2006.01)
*G06F 13/42*     (2006.01)

(52) U.S. Cl.
CPC ........ *G06F 13/385* (2013.01); *G06F 13/4282* (2013.01); *G06F 2213/0042* (2013.01)

(58) Field of Classification Search
CPC ............... G06F 13/385; G06F 13/4282; G06F 2213/0042
See application file for complete search history.

(56) References Cited

U.S. PATENT DOCUMENTS 6,567,866 B1    5/2003   Poisner
7,414,275 B2 *   8/2008   Greenberg ............ H01L 23/528
                                                            257/203
(Continued)

FOREIGN PATENT DOCUMENTS

CN         105071795       11/2015

OTHER PUBLICATIONS

Zheng, Kevin, "Share about Firmware-Hardware and the Latest USB Technology", http://kevinzhengwork.blogspot.in, Sep. 2014, 7 pages.
(Continued)

*Primary Examiner* — Jing-Yih Shyu
(74) *Attorney, Agent, or Firm* — Dicke Billig & Czaja PLLC (57) ABSTRACT

One example of a system includes a Universal Serial Bus Type-C (USB-C) port, a set of logic circuits, a multiplexer, and an embedded controller. The set of logic circuits includes a first logic circuit providing a first utility and a second logic circuit providing a second utility different from the first utility. The multiplexer is communicatively coupled between the set of logic circuits and the USB-C port. The embedded controller controls the multiplexer to connect the first logic circuit or the second logic circuit to the USB-C port based on a value of a multi-level strap received from a device connected to the USB-C port.

18 Claims, 5 Drawing Sheets

(56) References Cited

U.S. PATENT DOCUMENTS

| | | | |
|---|---|---|---|
| 2013/0159559 A1* | 6/2013 | Hess | G06F 13/385 |
| | | | 710/14 |
| 2013/0207595 A1 | 8/2013 | Helfrich | |
| 2013/0322010 A1 | 12/2013 | Hung et al. | |
| 2014/0013012 A1* | 1/2014 | Terlizzi | G06F 13/38 |
| | | | 710/15 |
| 2015/0219697 A1* | 8/2015 | Chen | G01R 19/165 |
| | | | 345/520 |
| 2015/0229161 A1 | 8/2015 | Talmola et al. | |
| 2015/0293514 A1 | 10/2015 | Tupala | |
| 2015/0331826 A1* | 11/2015 | Ghosh | G06F 13/4022 |
| | | | 710/313 |
| 2017/0359631 A1* | 12/2017 | Seiler | G06F 13/00 |

OTHER PUBLICATIONS

Texas Instruments, "TUSB320 USB Type-C Configuration Channel Logic and Port Control", TUSB320, TUSB320I, SLLSEN9A, Jun. 2015, 33 pages.

\* cited by examiner

USB-C PORT CONNECTIONS BASED ON MULTI-LEVEL STRAPS

BACKGROUND

Universal Serial Bus Type-C (USB-C) is a specification for USB compatible devices that uses a cable with reversible connectors at each end to communicatively couple corresponding USB-C ports of two devices to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The Universal Serial Bus Type-C (USB-C) cable connector includes 24-pins including four pairs for power/ground, two differential pairs for USB 2.0 data, four pairs for high-speed data, two sideband pins, and two configuration pins. USB-C may be used to communicatively couple computers, smartphones, tablets, peripheral devices (e.g., output devices, input devices, etc.), and other electronic devices to each other. As described herein, the sideband pins of the USB-C connector may be used for strapping and configuration of either a host device or another device including a USB-C port. By sensing different levels of voltages on these sideband pins, multiple devices may be supported though a USB-C port by controlling the connected functionally. In this way, the efficiency and functionality of a device may be increased.

Figure 1:
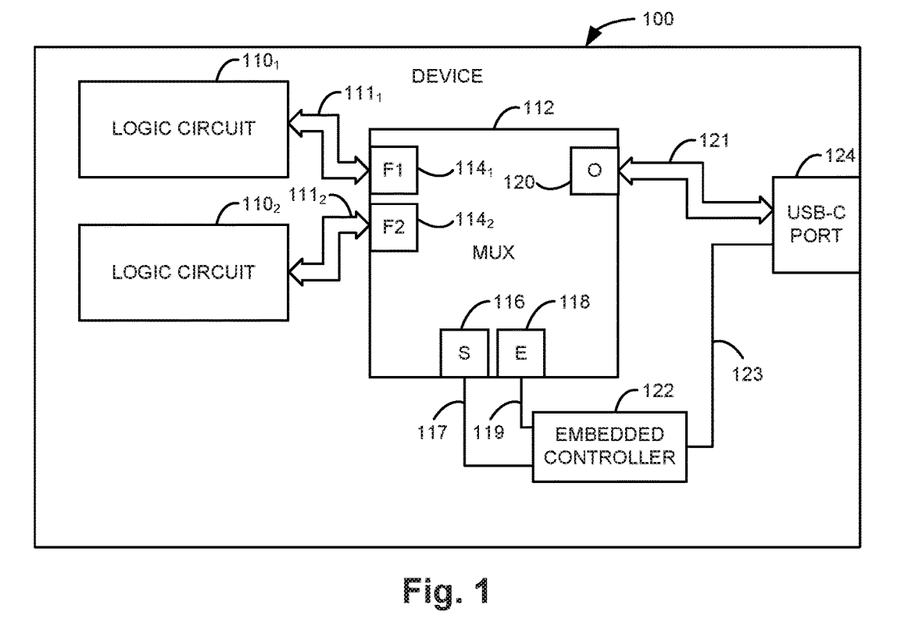
FIG. 1 is a block diagram illustrating one example of a device including a Universal Serial Bus Type-C (USB-C) port and a set of logic circuits.

FIG. 1 is a block diagram illustrating one example of a device 100. Device 100 may be a host device, a USB-C device, or another suitable device including a USB-C port. Device 100 includes a set of logic circuits including a first logic circuit $110_1$ providing a first utility and a second logic circuit $110_2$ providing a second utility different from the first utility. Device 100 also includes a multiplexer (MUX) 112, an embedded controller 122, and USB-C port 124.

Each logic circuit $110_1$ and $110_2$ is electrically coupled to an input (F1 and F2) $114_1$ and $114_2$ of multiplexer 112 through a communication path $111_1$ and $111_2$, respectively. A select input (S) 116 of multiplexer 112 is electrically coupled to a first output of embedded controller 122 through a communication path 117. An output enable input (E) 118 of multiplexer 112 is electrically coupled to a second output of embedded controller 122 through a communication path 119. An output (O) 120 of multiplexer 112 is electrically coupled to USB-C port 124 through a communication path 121. USB-C port 124 is electrically coupled to an input of embedded controller 122 through a communication path 123. Each communication path $111_1$, $111_2$ and 121 may include a plurality of signal lines.

Each logic circuit $110_1$ and $110_2$ may include a controller, an Application Specific Integrated Circuit (ASIC), or another suitable logic circuit. The function implemented by each logic circuit $110_1$ and $110_2$ may include a USB protocol, a display driver protocol, a security protocol, a Peripheral Component Interconnect Express (PCIe) protocol, or another suitable protocol. Multiplexer 112 selectively communicatively couples an input $114_1$ or $114_2$ to output 120 based on a select signal at select input 116. Multiplexer 112 enables output 120 based on an enable signal at output enable input 118.

USB-C port 124 may connect device 100 to another device including a USB-C port. With another device connected to USB-C port 124 through a cable, USB-C port 124 connects signal lines of the cable to output 120 of multiplexer 112 through communication path 121 and connects at least one signal line of the cable to embedded controller 122 through communication path 123. In one example, a value of a multi-level strap is received from the device connected to USB-C port 124 and passed to embedded controller 122. Embedded controller 122 receives the value of the multi-level strap and provides the select signal to select input 116 of multiplexer 112 based on the value of the multi-level strap. In one example, the value of the multi-level strap is a voltage between zero volts and a supply voltage of the device connected to USB-C port 124.

Embedded controller 122 may include an analog to digital converter to convert the value of the multi-level strap to a digital value to provide the select signal to select input 116 of multiplexer 112. Once a selected input $114_1$ or $114_2$ has been communicatively coupled to output 120 of multiplexer 112, embedded controller 122 enables the output of multiplexer 112 by providing an enable signal to output enable input 118 of multiplexer 112. With the output of multiplexer 112 enabled, a device connected to USB-C port 124 is communicatively coupled to first logic circuit $110_1$ or second logic circuit $110_2$.

Figure 2:
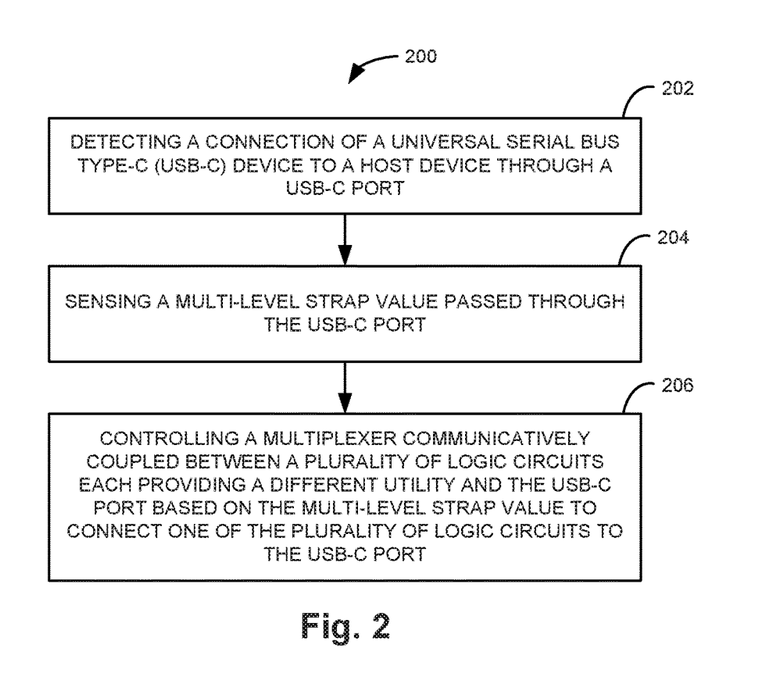
FIG. 2 is a flow diagram illustrating one example of a method for controlling a device including a USB-C port to connect to one of a plurality of logic circuits.

FIG. 2 is a flow diagram illustrating one example of a method 200 for controlling a device, such as device 100 previously described and illustrated with reference to FIG. 1. At 202, method 200 includes detecting a connection of a USB-C device to a host device through a USB-C port. In one example, detecting the connection includes detecting the connection of a USB-C device, which may communicate through a guest protocol other than USB, to the host device through the USB-C port. At 204, method 200 includes sensing a multi-level strap value passed through the USB-C port. At 206, method 200 includes controlling a multiplexer communicatively coupled between a plurality of logic circuits each providing a different utility and the USB-C port based on the multi-level strap value to connect one of the plurality of logic circuits to the USB-C port. In one example, an output of the multiplexer may be enabled once the multiplexer is controlled to connect one of the plurality of logic circuits to the USB-C port.

The method may further include performing a handshake between the USB-C device and the host device. In one example, sensing the multi-level strap value comprises sensing the multi-level strap value from the USB-C device, and controlling the multiplexer comprises controlling a multiplexer of the host device. In another example, sensing the multi-level strap value comprises sensing the multi-level strap value from the host device, and controlling the multiplexer comprises controlling a multiplexer of the USB-C device.

Figure 3:
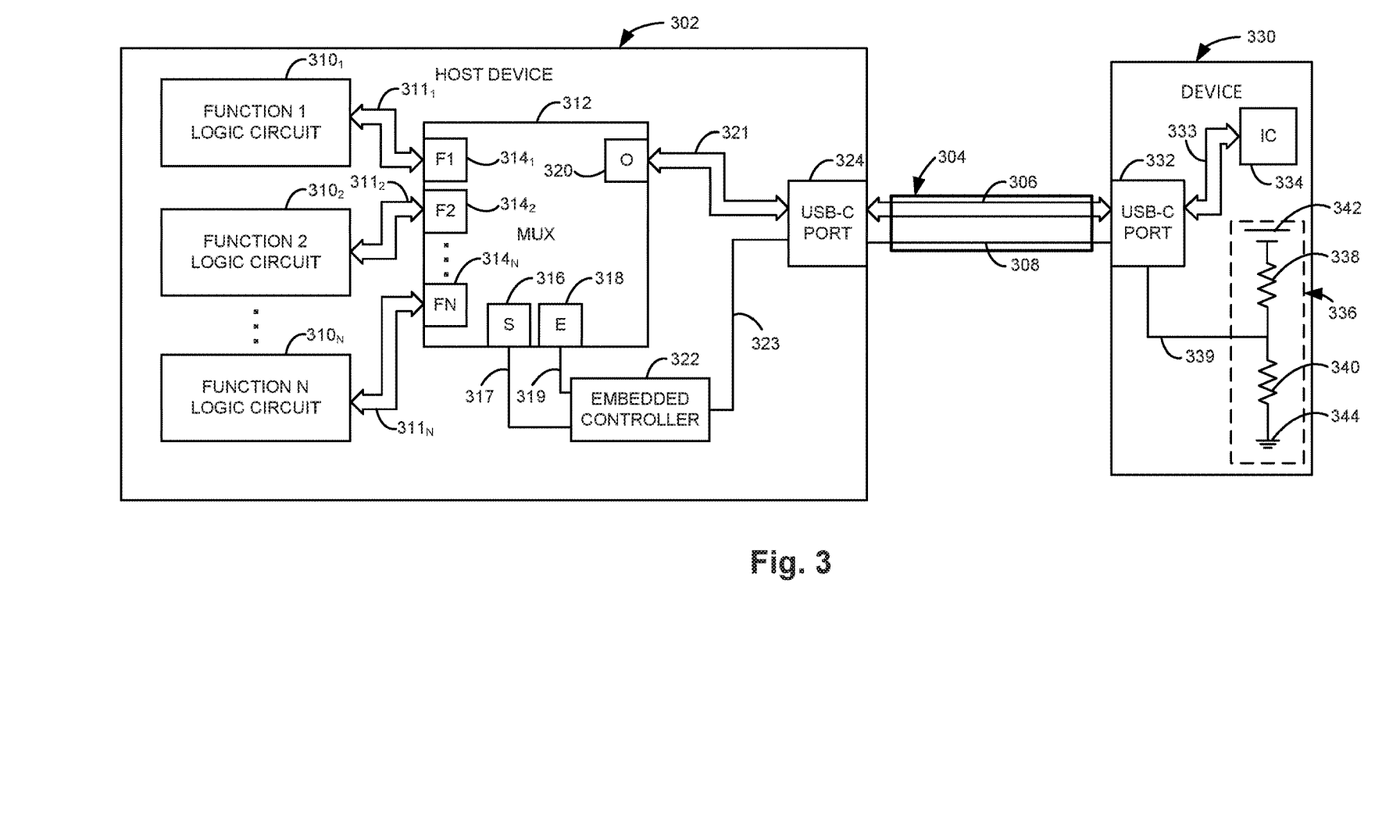
FIG. 3 is a block diagram illustrating one example of a system including a host device connected to another device through USB-C ports of the devices.

FIG. 3 is a block diagram illustrating one example of a system 300. System 300 includes a host device 302, a cable 304, and another device 330. Host device 302 may include a computer, a smartphone, a tablet, or another suitable host device. Device 330 may be a peripheral device or another suitable device. Host device 302 is communicatively coupled to device 330 through cable 304.

Host device 302 includes a plurality of logic circuits $310_1$ to $310_N$ each providing a different utility (i.e., function), where "N" is any suitable number of logic circuits. Host device 302 also includes a multiplexer (MUX) 312, an embedded controller 322, and a USB-C port 324. Each logic circuit $310_1$ to $310_N$ is electrically coupled to an input (F1 to FN) $314_1$ to $314_N$ of multiplexer 312 through a communication path $311_1$ to $311_N$, respectively. A select input (S) 316 of multiplexer 312 is electrically coupled to a first output of embedded controller 322 through a communication path 317. An output enable input (E) 318 of multiplexer 312 is electrically coupled to a second output of embedded controller 322 through a communication path 319. An output (O) 320 of multiplexer 312 is electrically coupled to USB-C port 324 through a communication path 321. USB-C port 324 is electrically coupled to an input of embedded controller 322 through a communication path 323. Each communication path $311_1$ to $311_N$ and 321 may include a plurality of signal lines.

Each logic circuit $310_1$ to $310_N$ may include a controller, an ASIC, or another suitable logic circuit. The function implemented by each logic circuit $310_1$ to $310_N$ may include a USB protocol, a display driver protocol, a security protocol, a PCIe protocol, or another suitable protocol. Multiplexer 312 selectively communicatively couples an input $314_1$ to $314_N$ to output 320 based on a select signal at select input 316. Multiplexer 312 enables output 320 based on an enable signal at output enable input 318.

Device 330 includes a USB-C port 332, an integrated circuit (IC) 334, and a multi-level strap 336. Multi-level strap 336 includes a resistive voltage divider including a first resistor 338 and a second resistor 340. USB-C port 332 is communicatively coupled to integrated circuit 334 through a communication path 333. Communication path 333 may include a plurality of signal lines. USB-C port 332 is communicatively coupled to one side of first resistor 338 and one side of second resistor 340 through a signal path 339. The other side of first resistor 338 is electrically coupled to a supply voltage 342. The other side of second resistor 340 is electrically coupled to a common or ground 344. The value of multi-level strap 336 provided on signal path 339 may be any suitable value between zero volts and the supply voltage depending on the resistance of first resistor 338 and second resistor 340. The value of multi-level strap 336 identifies the logic circuit $310_1$ to $310_N$ that may be communicatively coupled to integrated circuit 334 of device 330. The function implemented by integrated circuit 334 may include a USB protocol, a display driver protocol, a security protocol, a PCIe protocol, or another suitable protocol.

USB-C port 324 of host device 302 is connected to USB-C port 332 of device 330 through cable 304. Cable 304 includes signal lines 306 and at least one signal line 308. In one example, cable 304 is a USB-C cable and signal line 308 is a sideband signal line. USB-C port 324 of host device 302 connects signal lines 306 to output 320 of multiplexer 312 and connects the at least one signal line 308 to embedded controller 322. USB-C port 332 connects signal lines 306 to integrated circuit 334 and connects the at least one signal line 308 to multi-level strap 336.

When device 330 is connected to host device 302, embedded controller 322 receives the value of multi-level strap 336 and provides the select signal to select input 316 of multiplexer 312 based on the value of multi-level strap 336. Embedded controller 322 may include an analog to digital converter to convert the value of the multi-level strap to a digital value to provide the select signal to select input 316 of multiplexer 312. The select signal includes a resolution suitable for selecting any one of inputs $314_1$ to $314_N$ of multiplexer 312. For example, if "N" equals 3, the select signal has a resolution of at least two bits. Once a selected input $314_1$ to $314_N$ has been communicatively coupled to output 320 of multiplexer 312, embedded controller 322 enables the output of multiplexer 312 by providing an enable signal to output enable input 318 of multiplexer 312. With the output of multiplexer 312 enabled, integrated circuit 334 of device 330 is communicatively coupled to the selected logic circuit $310_1$ to $310_N$ of host device 302.

Figure 4:
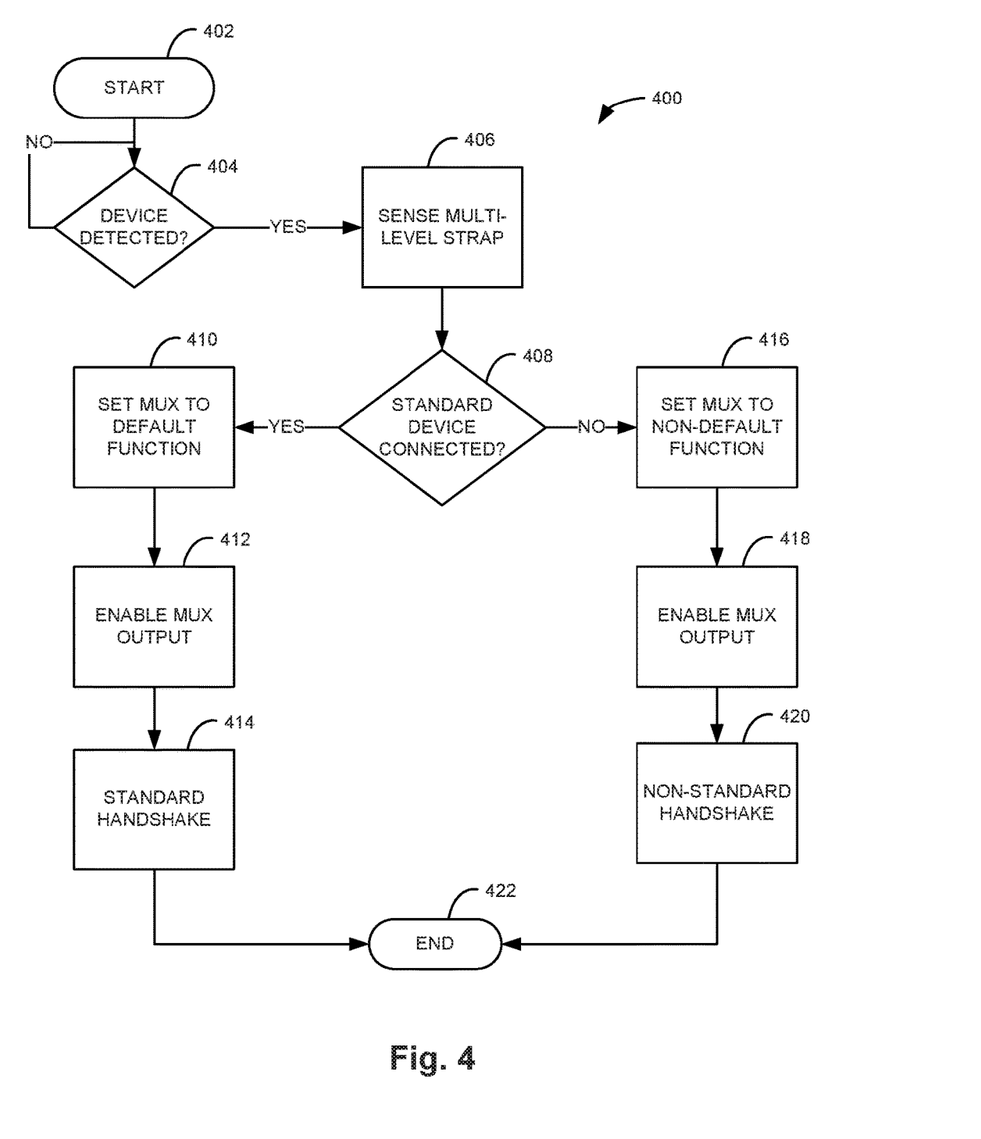
FIG. 4 is a flow diagram illustrating one example of a method for controlling the system of FIG. 3.

FIG. 4 is a flow diagram illustrating one example of a method 400 for controlling system 300 previously described and illustrated with reference to FIG. 3. Method 400 starts at 402. At 404, host device 302 waits until the connection of device 330 to USB-C port 324 is detected. In response to detecting device 330, at 406 embedded controller 322 of host device 302 senses the value of multi-level strap 336 of device 330. At 408, based on the value of multi-level strap 336, embedded controller 322 determines whether a standard device is connected. In response to device 330 being a standard device (e.g., implements a USB protocol) based on the multi-level strap value, at 410 multiplexer 312 is set to the default function (e.g., logic circuit $310_1$). At 412, the output of multiplexer 312 is enabled. At 414, host device 302 and device 330 perform a standard handshake.

In response to device 330 not being a standard device, at 416 multiplexer 312 is set to a non-default function (e.g., one of logic circuits $310_2$ to $310_N$) based on the multi-level strap value. At 418, the output of multiplexer 312 is enabled. At 420, host device 302 and device 330 perform a non-standard handshake. After host device 302 and device 330 perform a standard or non-standard handshake, method 400 ends at 422 and communication between host device 302 and device 330 is established for the selected function.

Figure 5:
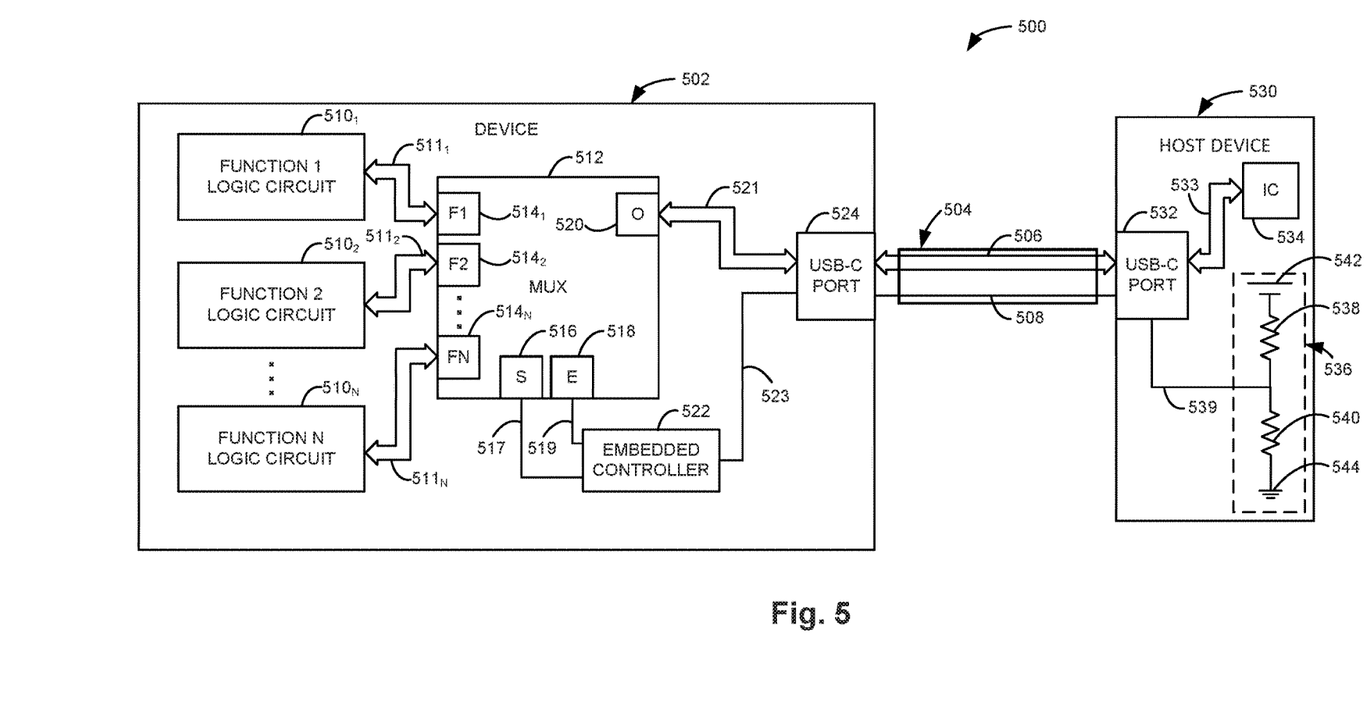
FIG. 5 is a block diagram illustrating another example of a system including a host device connected to another device through USB-C ports of the devices.

FIG. 5 is a block diagram illustrating one example of a system 500. System 500 includes a device 502, a cable 504, and a host device 530. Device 502 may be a peripheral device or another suitable device. Host device 530 may include a computer, a smartphone, a tablet, or another suitable host device. Device 502 is communicatively coupled to host device 530 through cable 504.

Device 502 includes a plurality of logic circuits $510_1$ to $510_N$ each providing a different utility (i.e., function), where "N" is any suitable number of logic circuits. Device 502 also includes a multiplexer (MUX) 512, an embedded controller 522, and a USB-C port 524. Each logic circuit $510_1$ to $510_N$ is electrically coupled to an input (F1 to FN) $514_1$ to $514_N$ of multiplexer 512 through a communication path $511_1$ to $511_N$, respectively. A select input (S) 516 of multiplexer 512 is electrically coupled to a first output of embedded controller 522 through a communication path 517. An output enable input (E) 518 of multiplexer 512 is electrically coupled to a second output of embedded controller 522 through a communication path 519. An output (O) 520 of multiplexer 512 is electrically coupled to USB-C port 524 through a communication path 521. USB-C port 524 is electrically coupled to an input of embedded controller 522 through a communication path 523. Each communication path $511_1$ to $511_N$ and 521 may include a plurality of signal lines.

Each logic circuit $510_1$ to $510_N$ may include a controller, an ASIC, or another suitable logic circuit. The function implemented by each logic circuit $510_1$ to $510_N$ may include a USB protocol, a display driver protocol, a security protocol, a PCIe protocol, or another suitable protocol. Multiplexer 512 selectively communicatively couples an input $514_1$ to $514_N$ to output 520 based on a select signal at select input 516. Multiplexer 512 enables output 520 based on an enable signal at output enable input 518.

Host device 530 includes a USB-C port 532, an integrated circuit (IC) 534, and a multi-level strap 536. Multi-level strap 536 includes a resistive voltage divider including a first resistor 538 and a second resistor 540. USB-C port 532 is communicatively coupled to integrated circuit 534 through a communication path 533. Communication path 533 may include a plurality of signal lines. USB-C port 532 is communicatively coupled to one side of first resistor 538 and one side of second resistor 540 through a signal path 539. The other side of first resistor 538 is electrically coupled to a supply voltage 542. The other side of second resistor 540 is electrically coupled to a common or ground 544. The value of multi-level strap 536 provided on signal path 539 may be any suitable value between zero volts and the supply voltage depending on the resistance of first resistor 538 and second resistor 540. The value of multi-level strap 536 identifies the logic circuit $510_1$ to $510_N$ that may be communicatively coupled to integrated circuit 534 of host device 530. The function implemented by integrated circuit 534 may include a USB protocol, a display driver protocol, a security protocol, a PCIe protocol, or another suitable protocol.

USB-C port 524 of device 502 is connected to USB-C port 532 of host device 530 through cable 504. Cable 504 includes signal lines 506 and at least one signal line 508. In one example, cable 504 is a USB-C cable and signal line 508 is a sideband signal line. USB-C port 524 of device 502 connects signal lines 506 to output 520 of multiplexer 512 and connects the at least one signal line 508 to embedded controller 522. USB-C port 532 connects signal lines 506 to integrated circuit 534 and connects the at least one signal line 508 to multi-level strap 536.

When host device 530 is connected to device 502, embedded controller 522 receives the value of multi-level strap 536 and provides the select signal to select input 516 of multiplexer 512 based on the value of the multi-level strap 536. Embedded controller 522 may include an analog to digital converter to convert the value of the multi-level strap to a digital value to provide the select signal to select input 516 of multiplexer 512. The select signal includes a resolution suitable for selecting any one of inputs $514_1$ to $514_N$ of multiplexer 512. Once a selected input $514_1$ to $514_N$ has been communicatively coupled to output 520 of multiplexer 512, embedded controller 522 enables the output of multiplexer 512 by providing an enable signal to output enable input 518 of multiplexer 512. With the output of multiplexer 512 enabled, integrated circuit 534 of host device 530 is communicatively coupled to the selected logic circuit $510_1$ to $510_N$ of device 502.

Figure 6:
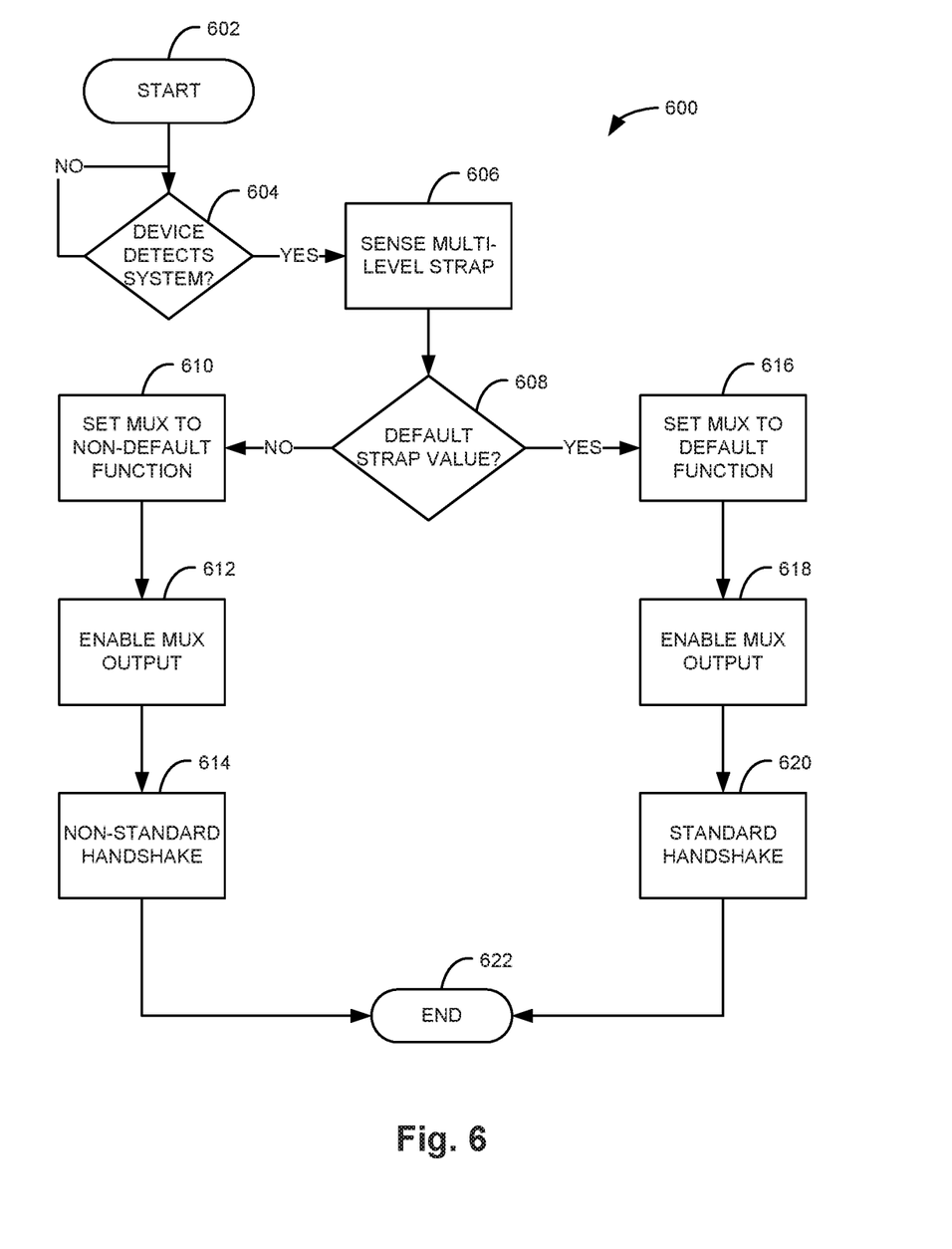
FIG. 6 is a flow diagram illustrating one example of a method for controlling the system of FIG. 5.

FIG. 6 is a flow diagram illustrating one example of a method 600 for controlling system 500 previously described and illustrated with reference to FIG. 5. Method 600 starts at 602. At 604, device 502 waits until the connection of host device 530 to USB-C port 524 is detected. In response to detecting host device 530, at 606 embedded controller 522 of device 502 senses the value of multi-level strap 536 of host device 530. At 608, embedded controller 522 determines whether a default strap value was received. In response to host device 530 not providing a default strap value, at 610 multiplexer 512 is set to a non-default function (e.g., one of logic circuits $510_2$ to $510_N$) based on the multi-level strap value. At 612, the output of multiplexer 512 is enabled. At 614, device 502 and host device 530 perform a non-standard handshake.

In response to host device 530 providing a default strap value (e.g., implements a USB protocol), at 616 multiplexer 512 is set to the default function (e.g., logic circuit $510_1$). At 618, the output of multiplexer 512 is enabled. At 620, device 502 and host device 530 perform a standard handshake. After device 502 and host device 530 perform a standard or non-standard handshake, method 600 ends at 622 and communication between device 502 and host device 530 is established for the selected function.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
   a Universal Serial Bus Type-C (USB-C) port;
   a set of logic circuits including a first logic circuit providing a first utility and a second logic circuit providing a second utility different from the first utility;
   a multiplexer communicatively coupled between the set of logic circuits and the USB-C port; and
   an embedded controller to control the multiplexer to connect the first logic circuit or the second logic circuit to the USB-C port based on a value of a multi-level strap received from a device connected to the USB-C port;
   wherein the embedded controller is to provide a first signal to connect the first logic circuit or the second logic circuit to an output of the multiplexer based on the value of the multi-level strap and a second signal to enable the output of the multiplexer once the output of the multiplexer is connected to the first logic circuit or the second logic circuit.

2. The system of claim 1, wherein the device comprises a USB-C device and the system comprises a host device.

3. The system of claim 1, wherein the device comprises a host device and the system comprises a USB-C device.

4. The system of claim 1, wherein the value of the multi-level strap comprises a value between zero volts and a supply voltage of the device.

5. The system of claim 1, wherein the value of the multi-level strap is received on a sideband signal line of the USB-C port.

6. The system of claim 1, wherein each of the first logic circuit and the second logic circuit comprises a controller or an Application Specific Integrated Circuit (ASIC).

7. The system of claim 1, wherein each of the first logic circuit and the second logic circuit implements a function including a USB protocol, a display driver protocol, a security protocol, or a Peripheral Component Interconnect Express (PCIe) protocol.

8. A system comprising:
- a first device comprising a first Universal Serial Bus Type-C (USB-C) port and a multilevel strap; and
- a second device comprising a second USB-C port, a plurality of logic circuits each providing a different utility, a multiplexer communicatively coupled between the plurality of logic circuits and the second USB-C port, and an embedded controller;
- wherein in response to the first USB-C port being coupled to the second USB-C port, the embedded controller senses a value of the multi-level strap and controls the multiplexer to connect one of the plurality of logic circuits to the second USB-C port based on the value of the multi-level strap;
- wherein the embedded controller is to provide a first signal to connect the first logic circuit or the second logic circuit to an output of the multiplexer based on the value of the multi-level strap and a second signal to enable the output of the multiplexer once the output of the multiplexer is connected to the first logic circuit or the second logic circuit.

9. The system of claim 8, wherein the multi-level strap comprises a resistive voltage divider.

10. The system of claim 8, wherein the value of the multi-level strap is received by the embedded controller through a sideband signal line of the second USB-C port.

11. The system of claim 8, further comprising: a USB-C cable coupling the first USB-C port to the second USB-C port.

12. The system of claim 8, wherein each of the plurality of logic circuits comprises a controller or an Application Specific Integrated Circuit (ASIC).

13. The system of claim 8, wherein each of the plurality of logic circuits implements a function including a USB protocol, a display driver protocol, a security protocol, or a Peripheral Component Interconnect Express (PCIe) protocol.

14. A method comprising:
- detecting a connection of a Universal Serial Bus Type-C (USB-C) device to a host device through a USB-C port;
- sensing a multi-level strap value passed through the USB-C port; and
- controlling a multiplexer communicatively coupled between a plurality of logic circuits each providing a different utility and the USB-C port based on the multi-level strap value to connect one of the plurality of logic circuits to the USB-C port;
- wherein sensing the multi-level strap value comprises sensing the multi-level strap value from the USB-C device, and wherein controlling the multiplexer comprises controlling a multiplexer of the host device.

15. The method of claim 14, further comprising:
performing a handshake between the USB-C device and the host device.

16. The method of claim 14, further comprising: enabling an output of the multiplexer once the multiplexer is controlled to connect one of the plurality of logic circuits to the USB-C port.

17. The method of claim 14, wherein sensing the multi-level strap value comprises sensing the multi-level strap value from the host device, and wherein controlling the multiplexer comprises controlling a multiplexer of the USB-C device.

18. The method of claim 14, wherein each of the plurality of logic circuits comprises a controller or an Application Specific Integrated Circuit (ASIC).

* * * * *

UNITED STATES PATENT AND TRADEMARK OFFICE
CERTIFICATE OF CORRECTION

PATENT NO. : 10,467,165 B2  
APPLICATION NO. : 15/748507  
DATED : November 5, 2019  
INVENTOR(S) : Connor Jam Watkins et al.

Page 1 of 1

It is certified that error appears in the above-identified patent and that said Letters Patent is hereby corrected as shown below:

In the Claims

In Column 7, Line 13, Claim 8, delete "multilevel" and insert -- multi-level --, therefor.

Signed and Sealed this  
Fourth Day of February, 2020

Andrei Iancu  
*Director of the United States Patent and Trademark Office*